United States Patent [19]
Bergano

[11] Patent Number: 5,912,755
[45] Date of Patent: *Jun. 15, 1999

[54] SYNCHRONOUS POLARIZATION AND PHASE MODULATION FOR IMPROVED PERFORMANCE OF OPTICAL TRANSMISSION SYSTEMS

[75] Inventor: Neal S. Bergano, Lincroft, N.J.

[73] Assignee: Tyco Submarine Systems Ltd., Eatontown, N.J.

[ * ] Notice: This patent is subject to a terminal disclaimer.

[21] Appl. No.: 08/600,102

[22] Filed: Feb. 8, 1996

Related U.S. Application Data

[63] Continuation of application No. 08/312,848, Sep. 27, 1994, Pat. No. 5,526,162.

[51] Int. Cl.[6] .................................... H04B 10/04
[52] U.S. Cl. .................. 359/181; 359/156; 359/158
[58] Field of Search ................................ 359/156, 158, 359/161, 176, 182, 183, 179, 181, 185–187

[56] References Cited

U.S. PATENT DOCUMENTS

| | | | |
|---|---|---|---|
| 4,965,857 | 10/1990 | Auracher | 359/156 |
| 5,107,358 | 4/1992 | Hodgkinson | 359/156 |
| 5,299,047 | 3/1994 | Kasturia | 359/189 |
| 5,309,530 | 5/1994 | Bergano et al. | 385/1 |
| 5,309,535 | 5/1994 | Bergano et al. | 385/38 |
| 5,327,511 | 7/1994 | Heismann et al. | 385/1 |
| 5,345,331 | 9/1994 | Bergano et al. | 359/341 |
| 5,361,270 | 11/1994 | Heismann | 372/27 |
| 5,416,626 | 5/1995 | Taylor | 359/156 |
| 5,473,458 | 12/1995 | Mamyshev et al. | 359/161 |

FOREIGN PATENT DOCUMENTS

| | | | |
|---|---|---|---|
| 0 361 150 | 9/1989 | Germany | 359/156 |
| 0064418 | 3/1988 | Japan | 359/156 |
| 5327626 | 12/1993 | Japan | 359/156 |

OTHER PUBLICATIONS

"Demonstration of Polarisation Independent Coherent Transmission by Synchronous Intra–Bit Polarisation Spreading", N. Caponio et al., Int. Conf. on Communications Record, Jun. 23–26, 1992, pp. 343–347.

"Spectral and Polarization Hole Burning in Neodymium Glass Lasers," IEEE Journal of Quantum Electronics, D. W. Hall et al., Vol. QE–19, No. 11, Nov. 1983, pp. 1704–1717.

Co–pending United States Patent Application Serial No. 08/173,288, N. S. Bergano Case 10, filed Dec. 23, 1993, entitled "Dual–Wavelength Data Transmitter for Reducing Fading in an Optical Transmission System".

*Primary Examiner*—Leslie Pascal
*Attorney, Agent, or Firm*—Mayer & Williams, LLC

[57] ABSTRACT

A method and apparatus is provided for modulating the polarization of an optical signal. A polarization modulator receives an optical signal onto which data has been modulated at a predetermined frequency. The polarization modulator modulates the state of polarization of the optical signal at a frequency phase locked and equal to the same predetermined frequency at which the data is modulated onto the optical signal. The polarization modulation is performed so that the average value of the state of polarization over each modulation cycle is substantially equal to zero.

16 Claims, 3 Drawing Sheets

5,912,755

SYNCHRONOUS POLARIZATION AND PHASE MODULATION FOR IMPROVED PERFORMANCE OF OPTICAL TRANSMISSION SYSTEMS

This is a continuation of application Ser. No. 08/312,848 filed Sep. 27, 1994, now U.S. Pat. No. 5,526,162.

FIELD OF THE INVENTION

The invention relates to the optical transmission of information and, more particularly, to improving transmission capabilities over optical fiber transmission systems.

BACKGROUND OF THE INVENTION

Very long optical fiber transmission paths, such as those employed in undersea or transcontinental terrestrial lightwave transmission systems which employ optical amplifier repeaters, are subject to decreased performance due to a host of impairments that accumulate along the length of the optical fiber composing the transmission path. Typically, in such long optical transmission systems, these impairments vary with time and cause a random fluctuation in the signal-to-noise ratio ("SNR") of the received signal. This random fluctuation contributes to a phenomenon known as signal fading. Signal fading can result in an increased bit error rate ("BER") for digital signals transmitted via the optical fiber path. When the SNR of a digital signal within such a transmission system becomes unacceptably small (resulting in an undesirably high BER), a signal fade is said to have occurred. Experimental evidence has shown that polarization dependent effects, induced by the optical fiber itself and/or other optical components (e.g., repeaters, amplifiers, etc.) along the transmission path, contribute to signal fading and SNR fluctuations. In particular, one of these effects has now been identified as polarization hole-burning ("PHB"), which is related to the population inversion dynamics of the optical amplifiers. A discussion of hole-burning is provided by D. W. Hall, R. A. Haas, W. F. Krupke, and M. J. Weber in "Spectral and Polarization Hole Burning in Neodymium Glass Lasers," *IEEE Journal of Quantum Electronics*, Vol. QE-19, No. 11, November 1983.

PHB reduces gain of the optical amplifiers within the long haul transmission system for any signal having a state of polarization ("SOP") parallel to that of the primary optical signal carried by the transmission system. However, the gain provided by these amplifiers for optical signals having an SOP orthogonal to that of the primary signal remains relatively unaffected. In simplified terms, the primary optical signal produces an anisotropic saturation of the amplifier that is dependent upon the SOP of the primary optical signal. The anisotropic saturation reduces the population inversion within the amplifier, and results in a lower gain for optical signals having the same SOP as the primary optical signal. This effectively causes the amplifier to preferentially enhance noise having an SOP orthogonal to that of the primary signal. This enhanced noise lowers the SNR of the transmission system and causes an increased BER.

Prior methods for reducing signal fading have included the use of systems that actively adjust the SOP of a signal launched into a given optical path, as a function of the quality of the signal received at the far end of the path. In some methods the SOP of the signal is scrambled. For example, systems are known for scrambling the SOP at frequencies both lower and higher than the bit rate. However, scrambling at frequencies lower than the bit rate causes AM modulation on the data signal within the receiver's bandwidth, thus reducing the potential improvement that can be achieved with low frequency scrambling. Scrambling at frequencies higher than the bit rate can reduce the AM modulation but causes an increase in the transmitted bandwidth, which can also degrade performance.

SUMMARY OF THE INVENTION

In accordance with the present invention, a method and apparatus is provided for modulating the polarization of an optical signal. A polarization modulator receives an optical signal onto which data has been modulated at a predetermined frequency. The polarization modulator modulates the state of polarization of the optical signal at a frequency phase locked and equal to the same predetermined frequency at which the data is modulated onto the optical signal. The polarization modulation is performed so that the average value of the state of polarization over each modulation cycle is substantially equal to zero. In one embodiment of the invention, the phase of the polarization modulation imparted to the optical signal is selectively varied by an electrical delay line such as a phase shifter, for example. In addition, the optical signal may be selectively phase modulated by an optical phase modulator while imparting substantially no polarization modulation to the optical signal.

DETAILED DESCRIPTION

Figure 1:
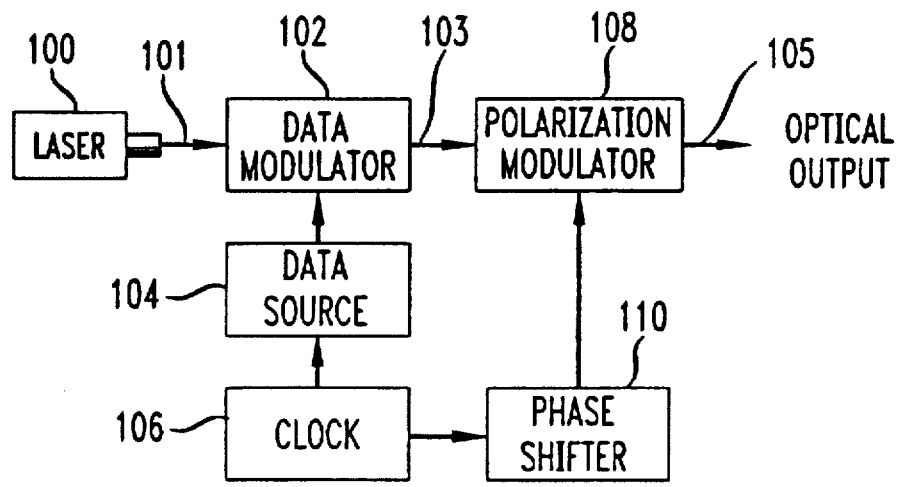
FIG. 1 shows a simplified block diagram of one embodiment of a phase-controlled polarization modulated transmitter in accordance with the present invention.

FIG. 1 shows a simplified block diagram of an exemplary arrangement facilitating the practice of the invention. As shown, the invention includes a laser 100 for producing a continuous wave (CW) optical signal 101. The optical signal 101 is transmitted to a data modulator 102 that modulates the signal to impart information thereto in a well known fashion, producing a modulated optical information signal 103. The data modulator 102 receives the data to be imparted to the optical signal 101 from a data source 104 and modulates the optical signal 101 at a frequency determined by a clock 106. The optical information signal 103 is transmitted from the data modulator 102 to a polarization modulator 108 which modulates the SOP of the optical information signal 103. Polarization modulator 108 operates to change the SOP of the optical information signal in such a way that it has no preferred SOP averaged over the modulation period. Accordingly, the output signal 105 has a degree of polarization that is substantially zero and is said to be polarization scrambled. In one example of the operation of the polarization modulator 108, the SOP of optical information signal 103 traces a complete great circle on the Poincaré sphere. Alternatively, the SOP of the optical signal may reciprocate along the Poincaré sphere. In either case, the average value of the SOP over each modulation cycle is substantially equal to zero. One example of a polarization modulator 108 that may be employed in the present invention is disclosed in U.S. Pat. No. 5,327,511, particularly in FIG. 3 of that reference.

In accordance with the present invention, the polarization modulator 108 is driven by the clock 106 so that the SOP of the optical information signal 103 is modulated at a rate equal to the rate at which data is imparted to the optical signal 101. In other words, the clock 106 causes the rate of polarization modulation to be frequency and phase locked to the rate of data modulation. The manner in which the clock 106 drives the polarization modulator 108 may be described by examining the electric field components of the optical signal on which the polarization modulator acts. In x-y coordinates these components may be expressed as follows:

$$E_x(t) = A_x(t) e^{i(\omega t + \phi_x(t))} \quad (1)$$

$$E_y(t) = A_y(t) e^{i(\omega t + \phi_y(t))} \quad (2)$$

where 107 is the optical carrier frequency, $\phi_x(t)$ and $\phi_y(t)$ are the phase angles of the optical signal 103 and $A_x(t)$ and $A_y(t)$ are assumed to be real field amplitudes and include the intensity modulation. In principle, every possible SOP of an optical signal having these electric field components can be obtained by varying the ratio $A_x/A_y$ while maintaining the value of $(A_x^2 + A_y^2)$ constant and varying the relative phase difference $\phi_x - \phi_y$ between 0 and $2\pi$. However, the polarization modulator 108 serves to modulate the SOP of the optical signal by varying only the phases $\phi_x$ and $\phi_y$, which is sufficient to provide a SOP whose average value over a modulation cycle is zero. Assuming a sinusoidal driving signal, this phase modulation may be written as:

$$\phi_x(t) = \gamma_x + \alpha_x \cos(\Omega t + \psi) \quad (3)$$

$$\phi_y(t) = \gamma_y + \alpha_y \cos(\Omega t + \psi) \quad (4)$$

The phase modulation imparted by the polarization modulator 108 provides a signal having x and y components with different fixed phases $\gamma_x$ and $\gamma_y$, which accounts for device birefringence. The phase modulation also introduces a sinusoidal variation that oscillates at a modulation frequency $\Omega$ with phase $\psi$ that is the same for both electric field components. However, the sinusoidal variation has different modulation indices $a_x$ and $a_y$ for the field components $E_x$ and $E_y$, respectively. The magnitudes of the modulation indices $a_x$ and $a_y$ determine the extent of the reciprocating trajectory that the SOP traverses on the Poincaré sphere. As one of ordinary skill in the art will recognize, while phase modulation of the form described by equations (3) and (4) does not produce every possible SOP, by properly adjusting the parameters it is possible to generate a signal that reciprocates along a trajectory on the Poincaré sphere whose average polarization is zero over a single modulation cycle. For example, if the amplitudes $A_x$ and $A_y$ are chosen to be equal, then by setting $a_x - a_y = 0.765\pi$, the average degree of polarization will be equal to zero. In this case the modulated optical signal 105 launched from the polarization modulator 108 will only trace 76% of a full great circle on the Poincaré sphere, but the modulated optical signal 105 will, on average, be completely depolarized.

Figure 3:
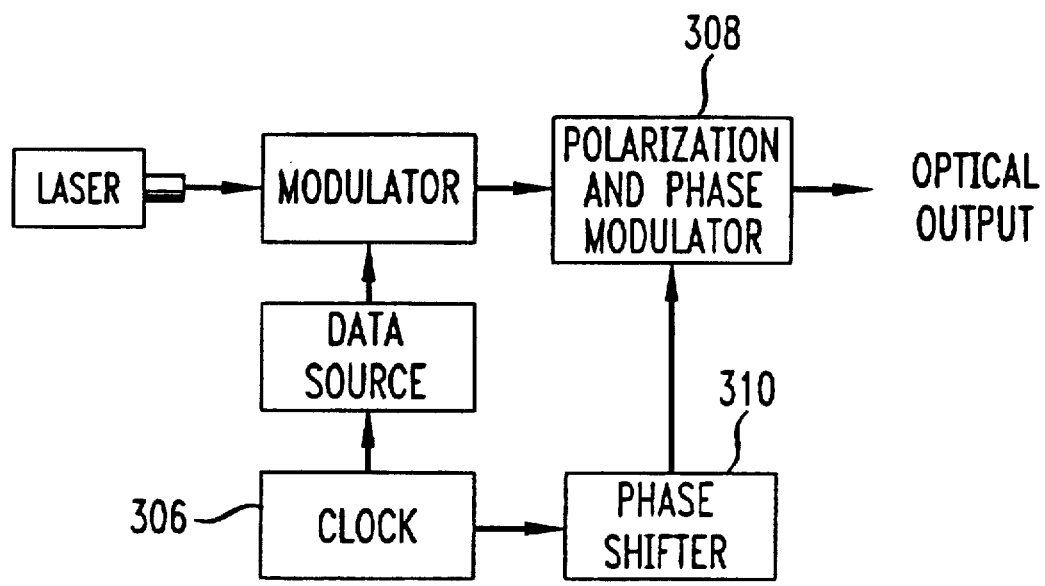

In the arrangement shown in FIG. 1, the polarization modulator 108 is driven at a modulation frequency 106, which is equal to the frequency of the clock 106. As further shown in FIG. 1, it typically will be advantageous to provide an electrical variable-delay line such as phase shifter 110 which couples the clock 106 to the polarization modulator 108. The phase shifter 110 is used to selectively adjust the phase $\psi$ of the polarization modulation relative to the phase of the data modulation. The phase is adjusted so that the signal-to-noise ratio of the received signal is maximized and may be determined empirically. The experimental results presented below in connection with FIG. 3 show the system performance as measured in terms of the SNR of the received signal versus the phase $\psi$. These results indicate that there is a definite value for the phase $\psi$ that provides good SNR performance. Once properly optimized, the apparatus shown in FIG. 1 provides a near optimal balance between low speed modulation and high speed modulation, minimizing the deleterious effects of residual AM modulation caused by low speed modulation and increased bandwidth caused by high speed modulation.

In addition to the polarization modulation imparted to signal 103 by the polarization modulator 108, there is also a net or excess phase modulation given by the average value of the phase angles $\phi_x$ and $\phi_y$. In the embodiment of the invention shown in FIG. 1 it is assumed that this average phase modulation is zero. However, as discussed below, the embodiments of the invention shown in FIGS. 2 and 3 allow for non-zero excess phase modulation.

There are two categories of phenomena that can convert the polarization and/or the phase modulation to AM modulation, namely, those that are polarization dependent, and those that are polarization independent. An example of a polarization dependent phenomena is mediated by polarization dependent loss (PDL) in the transmission medium, and as such, can fluctuate in time, causing additional signal fading. An example of a polarization independent phenomena is mediated by chromatic dispersion and/or a nonlinear index of refraction in the transmission fiber and as such does not fluctuate in time. As explained in what follows, the AM generated by modulating the polarization at the bit rate does not significantly contribute to signal fading.

When a polarization scrambled signal encounters an element having (PDL), AM modulation can occur at the modulation frequency $\Omega$ and harmonics thereof (i.e., $2\Omega$, $3\Omega$, . . . ). The amount of AM, and the phase relationship of the AM with respect to the phase of the polarization modulation depends in general on the orientation of the loss axis of the PDL element with respect to the polarization modulation axis. The amount of AM that occurs will wander in time since the state-of-polarization of the optical signal wanders in time. As is known to those of ordinary skill in the art, a typical fiber optic receiver has an electrical bandwidth of about 60% of the data rate. Thus, some of the AM modulation occurring at the bit rate can pass through the receiver to the decision circuit and effect the BER. However, the BER is unaffected by AM that occurs at harmonics of the bit rate having a frequency of $2\Omega$ or higher since these harmonics are blocked by the receiver. From an analysis of the formation of AM caused by the interaction between the reciprocating SOP of the optical signal and the PDL elements, it can be shown that the majority of the AM modulation occurs at harmonics of the modulation frequency (i.e., $2\Omega$ and higher) and not at the fundamental modulation frequency $\Omega$. Thus, as noted above, the AM generated by modulating the polarization at the bit rate does not significantly contribute to signal fading, assuming a properly designed optical receiver is employed. The AM generated by the conversion of polarization and/or phase modulation as a result of the chromatic dispersion and/or the nonlinear index of refraction of the optical fiber can be beneficial if the polarization modulation is performed at the bit rate.

Figure 2:
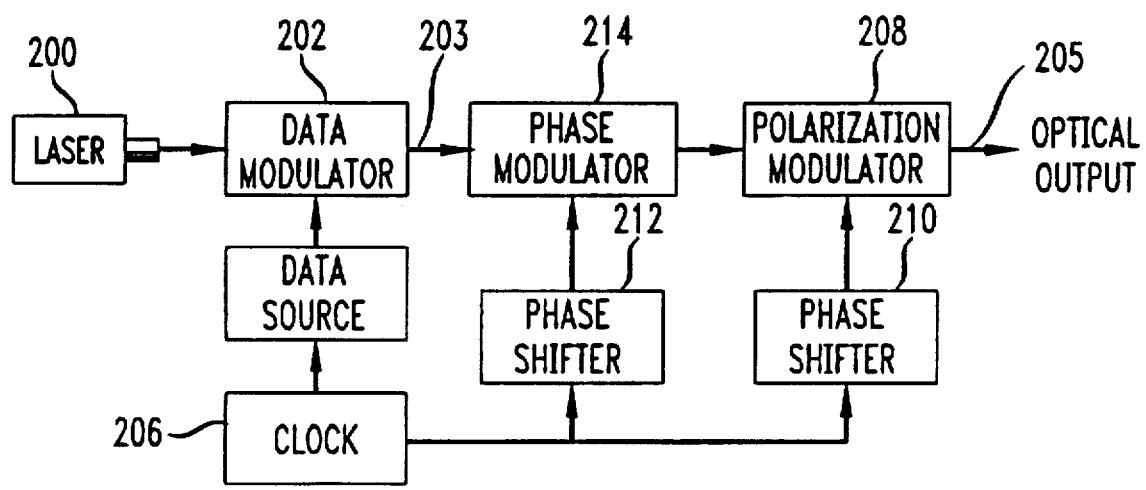
FIGS. 2 and 3 show simplified block diagrams of alternative embodiments of the phase-controlled polarization modulated transmitter in accordance with the present invention.

FIG. 2 shows an alternative embodiment of the invention in which an optical phase modulator 214 couples the data modulator 202 to the polarization modulator 208. The clock 206 drives the polarization modulator 208 as in FIG. 1 as well as the optical phase modulator 214 via electrical variable-delay lines 210 and 212, respectively. As in the embodiment of the invention shown in FIG. 1, the invention contemplates the use of any appropriate type of variable-delay lines, such as phase shifters, for example. In this embodiment of the invention the polarization modulation imparted to the optical signal 203 includes two separate and independent phases: a phase $\psi_2$ associated with polarization modulator 208 and a phase $\psi_1$ associated with the optical phase modulator 214. Thus, the phase angles $\phi_x$ and $\phi_y$ of the optical signal 205 launched from the polarization modulator 208 become:

$$\phi_x(t)=\gamma_x+a_x\cos(\Omega t+\psi_1)+b\cos(\Omega t+\psi_2) \quad (5)$$

$$\phi_y(t)=\gamma_y+a_y\cos(\Omega t+\psi_1)+b\cos(\Omega t+\psi_2) \quad (6)$$

As equations (5) and (6) indicate, the optical phase modulator 214 imparts the same phase modulation to both the x and y components of the optical signal 203. Accordingly, the optical phase modulator 214 modulates the optical phase of signal 203 without modulating the polarization of the optical signal. The reason the optical phase modulator 214 does not modulate the polarization is because the polarization modulation of the optical signal is proportional to the difference between the phases $\phi_x$ and $\phi_y$, and this difference is unaffected by the optical phase modulator 214 since it modulates both $\phi_x$ and $\phi_y$ by equal amounts. However, by introducing the phase $\psi_2$ as an additional selectively adjustable parameter, various amplitude errors that adversely effect performance when using a non-return to zero (NRZ) modulation format can be reduced. These amplitude errors may be caused by a variety of factors including amplifier noise, chromatic dispersion and fiber nonlinearities. As mentioned above, the AM generated from the conversion of polarization and phase modulation, which is caused by an interaction between the signal and the chromatic dispersion and nonlinear index of refraction of the fiber, can be beneficial if the phase of the AM is properly adjusted with respect to the data. A graphical method for evaluating the impact of impairments to a signal other than noise is known to those of ordinary skill in the art as an eye diagram. The AM that is generated can "open" the eye of the received data and compensate for eye closure caused by amplitude types of errors. By properly adjusting the phase $\psi_2$, the eye opening can be improved. In operation, the phase $\psi_2$ is adjusted via the phase shifter 212 until the SNR of the received is optimized.

In FIG. 3 the functions of the phase modulator 214 and the polarization modulator 208 shown in FIG. 2 are both incorporated into a single unit 308. In this case a single phase shifter 310 is used to vary both the polarization modulation and the optical phase modulation. In this case the polarization modulation is given by the difference in the angles $\phi_1-\phi_2$ and is adjusted for a low degree of polarization. The excess phase modulation is given by the average of the two angles $(\phi_1+\phi_2)/2$. The operation of this embodiment of the invention is similar to that shown in FIG. 2 with $\psi_1=\psi_2$.

Figure 4:
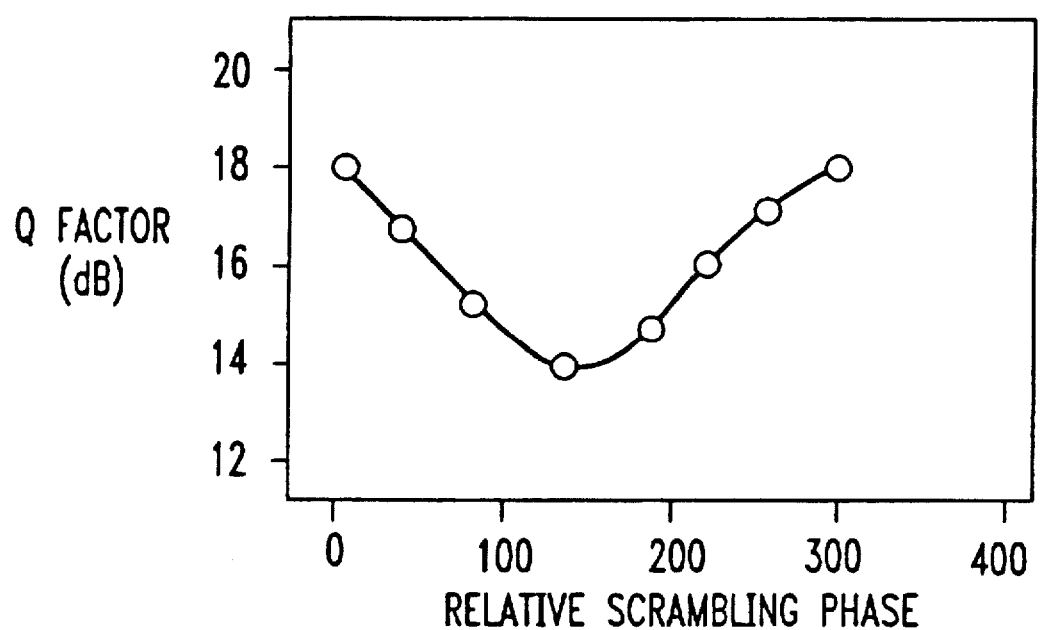
FIG. 4 shows the resulting Q-factor versus phase for an arrangement employing the transmitter shown in FIG. 3.

FIG. 4 shows the results of an experiment performed using the arrangement shown in FIG. 3. The transmission path, which used circulating loop techniques, extended 6300 kms and employed a bit rate of 2.5 Gbits/sec with an average launch power of 2.5 dBm. The figure shows the resulting Q-factor (i.e., the electrical SNR) versus the phase $\psi$. The data indicates that good SNR performance can be achieved by selecting an appropriate value for the phase $\psi$.

Figure 5:
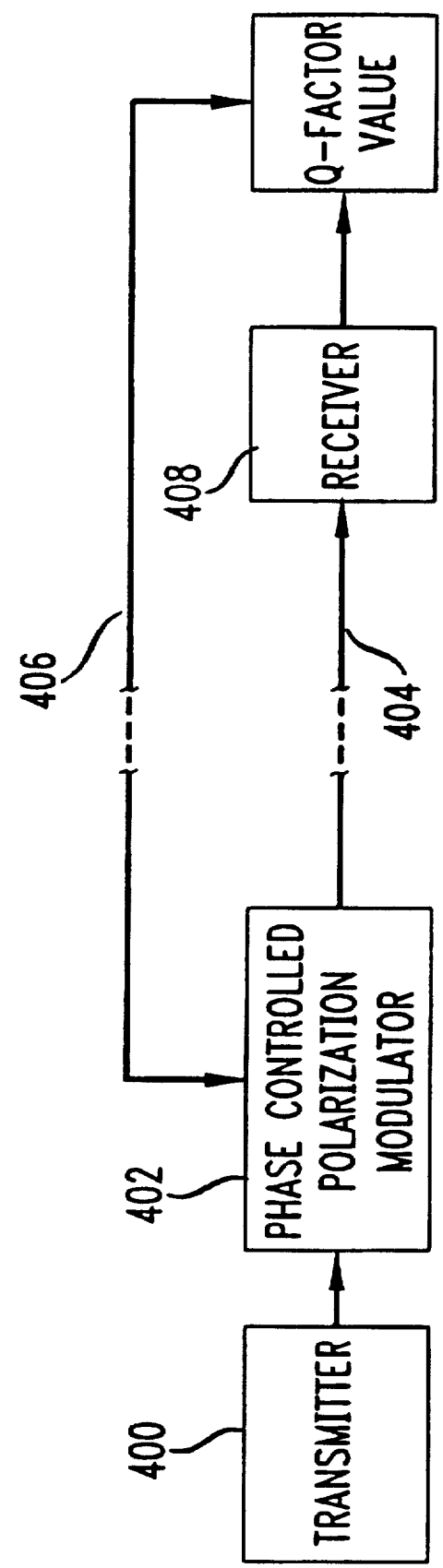
FIG. 5 shows an embodiment of a transmission system architecture including a transmitter, phase-controlled polarization modulator, receiver, transmission path, and telemetry path, in accordance with the present invention.

FIG. 5 is an example of a transmission system including a transmitter, receiver, transmission path, and telemetry path in accordance with the present invention. Shown are transmitter 400, phase controlled polarization modulator 402 embodying the characteristics of the arrangement shown in FIGS. 2 or 3, transmission medium 404, and telemetry path 406 which connects receiver 408 to transmitter 400 to feedback a characteristic of the received signal such as the SNR or the Q-factor. Transmission medium 404, for purposes of this example, but not as a limitation on the invention, is a chain of optical amplifiers and single-mode optical fibers. These elements are well known in the art.

Transmitter 400 produces an optical information signal whose polarization is modulated by the phase controlled polarization modulator 402 as described above. The resulting polarization modulated signal passes through transmission medium 404 and then into receiver 408. At the receiver, the Q-factor is measured as an indication of transmission performance. The Q-factor value is sent back to the polarization modulator 402 via telemetry path 406. It will be appreciated by those skilled in the art that it may be desirable, in some applications, for telemetry path 406 to be part of the same transmission system, such as overhead bits in a SONET frame, or an order-wire channel, or be transmitted on a different channel, such as a separate phone line. The Q-factor value is received and processed by a logic element that may be located, for example, within the polarization modulator 402. The logic element controls the phase modulation imparted to the signal by the polarization modulator 402 in accordance with equations (5) and (6) described above to maximize the received Q-factor. In particular, the logic element may control the values of $a_x$, $a_y$, $\psi_1$, $\psi_2$ and/or b, for example.

I claim:

1. An apparatus for transmitting an optical signal comprising:

means for generating an optical signal onto which data is modulated at a definable frequency;

means for modulating the polarization of the optical signal by tracing the polarization of said optical signal along at least a portion of a Poincare' sphere such that an average value of the state of polarization over a modulation cycle is substantially equal to zero;

means, coupled to the polarization modulator, for determining the frequency of the modulation cycle, said frequency being phase locked and equal to said definable frequency; and wherein the modulating means modulates the state of polarization of the optical signal at said definable frequency with a prescribed phase, and further comprising an electrical variable-delay line coupling said frequency determining means to said modulating means for selectively varying the prescribed phase.

2. The apparatus of claim 1 wherein said electrical variable-delay line is a phase shifter.

3. The apparatus of claim 1 further comprising an optical phase modulator coupling the generating means to the modulating means, said optical phase modulator providing optical phase modulation to the optical signal while imparting substantially no polarization modulation to the optical signal.

4. The apparatus of claim 3 wherein said frequency determining means is coupled to said optical phase modulator so that said optical phase modulator provides optical phase modulation at a frequency that is phase locked and equal to said definable frequency.

5. The apparatus of claim 4 further comprising a second electrical variable-delay line coupling said frequency determining means to said optical phase modulator for selectively varying the phase of said optical phase modulation provided by the optical phase modulator.

6. The apparatus of claim 5 wherein said electrical variable-delay line is a phase shifter.

7. The apparatus of claim 3 wherein said electrical variable-delay line couples said frequency determining means to said optical phase modulator such that the phase of said optical phase modulation provided by the optical phase modulator is substantially equal to the prescribed phase.

8. The apparatus of claim 7 wherein said electrical variable-delay line is a phase shifter.

9. An apparatus for modulating the polarization of an optical signal comprising:

means for modulating the polarization of a received optical signal onto which data has been modulated at a definable frequency by tracing the polarization of said optical signal along at least a portion of a Poincare' sphere such that an average value of the state of polarization over a modulation cycle is substantially equal to zero;

means, coupled to the polarization modulator, for determining the frequency of the modulation cycle, said frequency means being phase locked and equal to said definable frequency; and wherein said modulating means modulates the state of polarization of the optical signal at said definable frequency with a prescribed phase, and further comprising an electrical variable-delay line coupling said frequency determining means to said polarization modulator for selectively varying the prescribed phase.

10. The apparatus of claim 9 wherein said electrical variable-delay line is a phase shifter.

11. The apparatus of claim 9 further comprising an optical phase modulator coupling an optical signal source to the polarization modulating means, said optical phase modulator providing optical phase modulation to the optical signal while imparting substantially no polarization modulation to the optical signal.

12. The apparatus of claim 11 wherein said frequency determining means is coupled to said optical phase modulator so that said optical phase modulator provides optical phase modulation at a frequency that is phase locked and equal to said definable frequency.

13. The apparatus of claim 12 further comprising a second electrical variable-delay line coupling said frequency determining means to said optical phase modulator for selectively varying the phase of said optical phase modulation provided by the optical phase modulator.

14. The apparatus of claim 13 wherein said electrical variable-delay line is a phase shifter.

15. The apparatus of claim 11 wherein said electrical variable-delay line couples said frequency determining means to said optical phase modulator such that the phase of said optical phase modulation provided by the optical phase modulator is substantially equal to the prescribed phase.

16. The apparatus of claim 15 wherein said electrical variable-delay line is a phase shifter.

* * * * *